United States Patent [19]
Bolsworth et al.

[11] Patent Number: 5,482,345
[45] Date of Patent: Jan. 9, 1996

[54] VAN-TYPE VEHICLE SEAT FRONT RISER LATCH SYSTEM

[75] Inventors: James Bolsworth; Kenneth S. Pyszel, both of Sterling Heights; Garrett P. Baitinger, St. Clair Shores; Joseph D. Kondziola, Troy, all of Mich.

[73] Assignee: General Motors Corporation, Detroit, Mich.

[21] Appl. No.: 231,631

[22] Filed: Apr. 22, 1994

[51] Int. Cl.$^6$ ........................................... B60N 2/10
[52] U.S. Cl. ................. 276/65.1; 297/336; 248/398; 248/503.1
[58] Field of Search ............... 296/63, 65.1, 68.1, 296/69; 297/331, 335, 336; 248/398, 503.1

[56] References Cited

U.S. PATENT DOCUMENTS

| | | | |
|---|---|---|---|
| 3,880,464 | 4/1975 | Murphy et al. | 297/326 |
| 4,438,974 | 3/1984 | Kresky et al. | 297/379 |
| 4,770,989 | 10/1987 | Ercilla | 297/331 |
| 4,773,693 | 9/1988 | Premji et al. | 296/65.1 |
| 4,865,377 | 9/1989 | Musser et al. | 296/65.1 |
| 4,925,229 | 5/1990 | Siebler | 296/65.1 |
| 4,978,158 | 12/1990 | Kubo et al. | 296/65.1 |
| 4,988,134 | 1/1991 | Vidwans et al. | 292/198 |
| 5,094,487 | 3/1992 | Drewry | 294/68.26 X |
| 5,238,285 | 8/1993 | Holdampf et al. | 296/65.1 |
| 5,282,662 | 2/1994 | Bolsworth et al. | 296/65.1 |

FOREIGN PATENT DOCUMENTS 104425  6/1982  Japan ........................ 296/65.1

*Primary Examiner*—Dennis H. Pedder
*Attorney, Agent, or Firm*—Ernest E. Helms

[57] ABSTRACT

A latch system for a vehicle seat leg is provided. The seat has a seating position in which it is generally horizontally oriented with front and rear legs connected to the vehicle floor via floor pins, and the seat has a storage position wherein only the front legs are connected to the vehicle floor with the seat inclined upwardly. The latch system includes a pin contact surface on the front leg; a fork bolt pivotally mounted to the front leg having a nest for engagement with the pin, the fork bolt having a locking position engaged with the pin and a releasing position allowing removal of the front leg from the floor pin; a detent lever mounted to the front leg and having a first position preventing movement of the fork bolt and a second releasing position allowing the fork bolt to move to a releasing position; a cable connected to the detent lever for pulling the detent lever to the releasing position; a handle connected to the cable, mounted to the seat and biased to a first locking position away from a releasing position wherein the handle is pulling on the cable, thereby moving the detent lever to the releasing position; and a pendulum mounted to the handle that blocks movement of the handle to the releasing position when the seat is in the seating position and that allows the handle to move to the releasing position when the seat is in the storage position.

6 Claims, 5 Drawing Sheets

VAN-TYPE VEHICLE SEAT FRONT RISER LATCH SYSTEM

FIELD OF THE INVENTION

The field of the present invention is that of removable-type seating for van-type vehicles. More particularly, the field of the present invention is that of van-type seating wherein the seat may be inclined upwardly on its forward risers to allow for storage in the area that the seat would normally occupy when positioned in its normal seating arrangement.

BACKGROUND OF THE INVENTION

It is common in van-type vehicles, especially minivans, to have seats in the second and third rows of the vehicle which may be readily removed to allow additional cargo space. Additionally, it has been found to be preferable to provide some seats wherein the rear legs or risers of the vehicle seat may be released from the vehicle floor and the seat then assumes a storage position where it is inclined upwardly, allowing more storage room in the vehicle without the necessity of totally removing the vehicle seat. Examples of such seats are shown in Mastrangelo et al, U.S. Pat. No. 5,364,152, and Bolsworth et al, U.S. Ser. No. 08/140,940, now abandoned, both commonly assigned.

SUMMARY OF THE INVENTION

The present application provides a latch system primarily for the forward riser of a vehicle seat which is an alternative to the above-described disclosures and which provides an added advantage of a lower release effort to effectuate the removal of the front riser from the vehicle floor. Additionally, in a preferred embodiment of the present invention, the front risers of the vehicle seat (which remain locked to the vehicle floor in the storage position) may be released from the vehicle floor, and the vehicle seat may additionally be grabbed and handled by the utilization of just one hand by a vehicle operator.

These and other advantages will be more apparent to those skilled in the art as the present invention is revealed in greater detail in the accompanying drawings and detailed description.

DESCRIPTION OF THE PREFERRED EMBODIMENT

Figure 1:
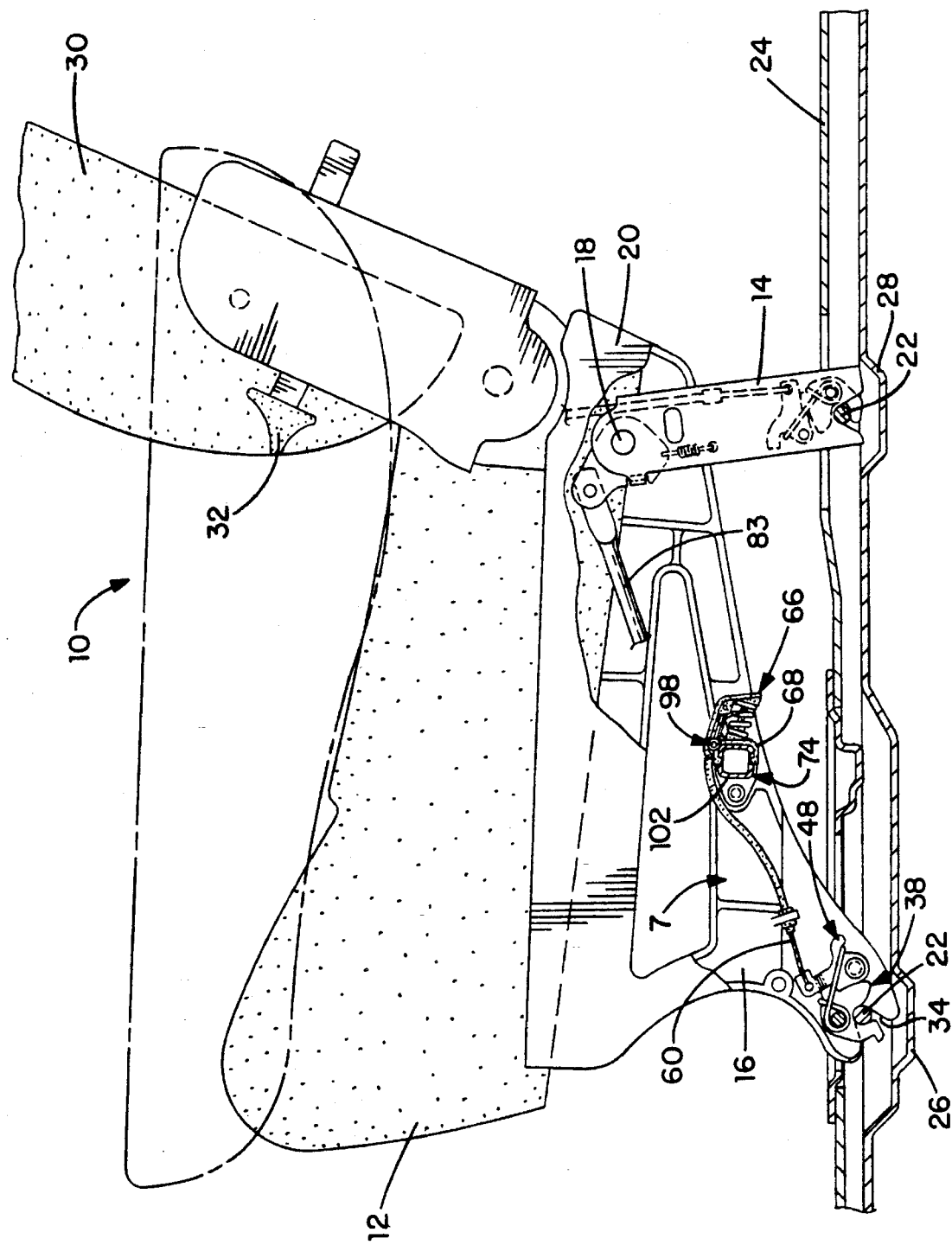
FIG. 1 is a side elevational view, partially sectioned, of a removable van-type vehicle seat in a normal seating position having front and forward risers secured to pins within a vehicle floor with the forward riser having a preferred embodiment latch system according to the present invention.

Referring to FIG. 1, a van-type vehicle seat 10 is shown in its normal seating position. In the normal seating position, the seat 10 generally horizontally oriented seating portion 12 is supported by two parallel (only one side shown, both sides being generally identical and symmetrical) rear supports or legs 14 and forward or front supports or legs, commonly referred to as risers, 16. The rear legs 14 are pivotally mounted by a pin 18 to an underframe 20. The front risers 16 are integral with the underframe 20. Underframe 20 may commonly be referred to as a rearward portion of the front riser 16. The underframe 20 has a cross tube 74. Both the rear legs 14 and front risers 16 are latched with pins 22 mounted within a floor 24 of the vehicle. The front floor depression 26 and rear floor depression 28 are configured in a different manner to ensure that the seat 10 is positioned in the proper orientation within the vehicle.

Pivotally mounted to the general seating portion 12 of the seat is a seatback 30. A common lever 32 controls the inclination of the seatback 30 for a reclining seat position (not shown), the forward folding of the seatback to the phantom position shown in FIG. 1, and also the release of the rear legs 14 from their associated pin 22 in a manner similar to that shown and described in the aforementioned application of Bolsworth et al. However, the latch release lever system of Bolsworth et al is not required for use of the present invention.

Figure 2:
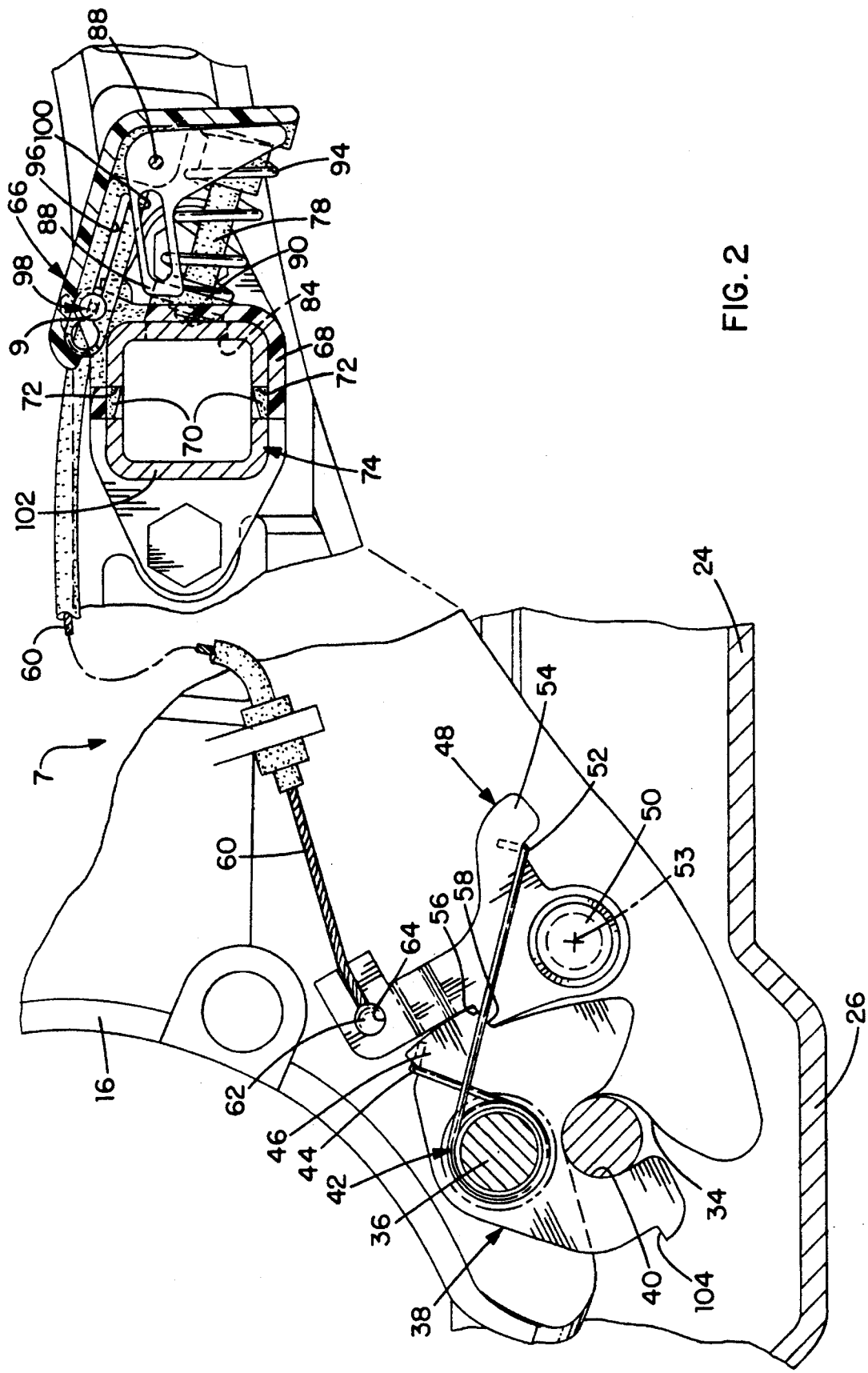
FIG. 2 is an enlarged view of the front riser latch mechanism with portions sectioned showing the latch mechanism in a locked position as shown in FIG. 1.

Referring to FIG. 2, the latching system 7 is shown in greater detail. At least one and preferably both front risers will have a latching system as shown in FIGS. 1–4 wherein the front riser 16 has a nest or pin contact surface 34. The pin contact surface generally mates with the forward pin 22.

Pivotally connected with the riser via a pin 36 is a fork bolt 38. The fork bolt 38 has a nest 40 which engages with the pin 22 and captures the pin 22 between itself and the riser contact surface 34. As shown in FIG. 2, the fork bolt 38 is retained in a locking position by a torsion spring 42. Torsion spring 42 is wrapped around pin 36 and has an end 44 bent around an ear 46 of the fork bolt 38.

Retaining the fork bolt 38 in the first locking position is a detent lever 48. The detent lever 48 is pivotally mounted to the front riser 16 via a pin 50 and is biased to rotate as shown in FIG. 2 in a counterclockwise direction by an end 52 of the spring 42, which is wrapped around an ear 54 of the detent lever. The detent lever 48 has a step 56 which makes contact with an edge 58 of the fork bolt, which prevents the fork bolt from rotating under the influence of the biasing spring 42. There a special camming configuration relationship between the step 56 on the detent lever and the surface 58 on the fork bolt so that any lifting out force on the riser 16 will cause a force to act normal to the step 56 and surface 58, passing through a pin center 53. Therefore, excessive force pulling away from the front riser will not cause the detent lever to rotate outwardly. To pull the detent lever 48 to a release position, there is a cable 60 which has a ball end 62 captured within an eyelet 64 of the fork bolt 38.

The latch system 7 also has associated therewith a handle 66. The handle 66 is mounted by a housing 68 of a generally inverted C-shape with inwardly projecting tabs 70. Tabs 70 resiliently lock into apertures 72 provided in the cross tube 74. The housing is typically a moldable polymeric part. The handle 66 has relative linear movement with respect to the housing 68. The handle 66 has two generally parallel stud members 78. Pendulum 80 is pivotally mounted directly to the handle 66 by virtue of a pin 82.

Figure 3:
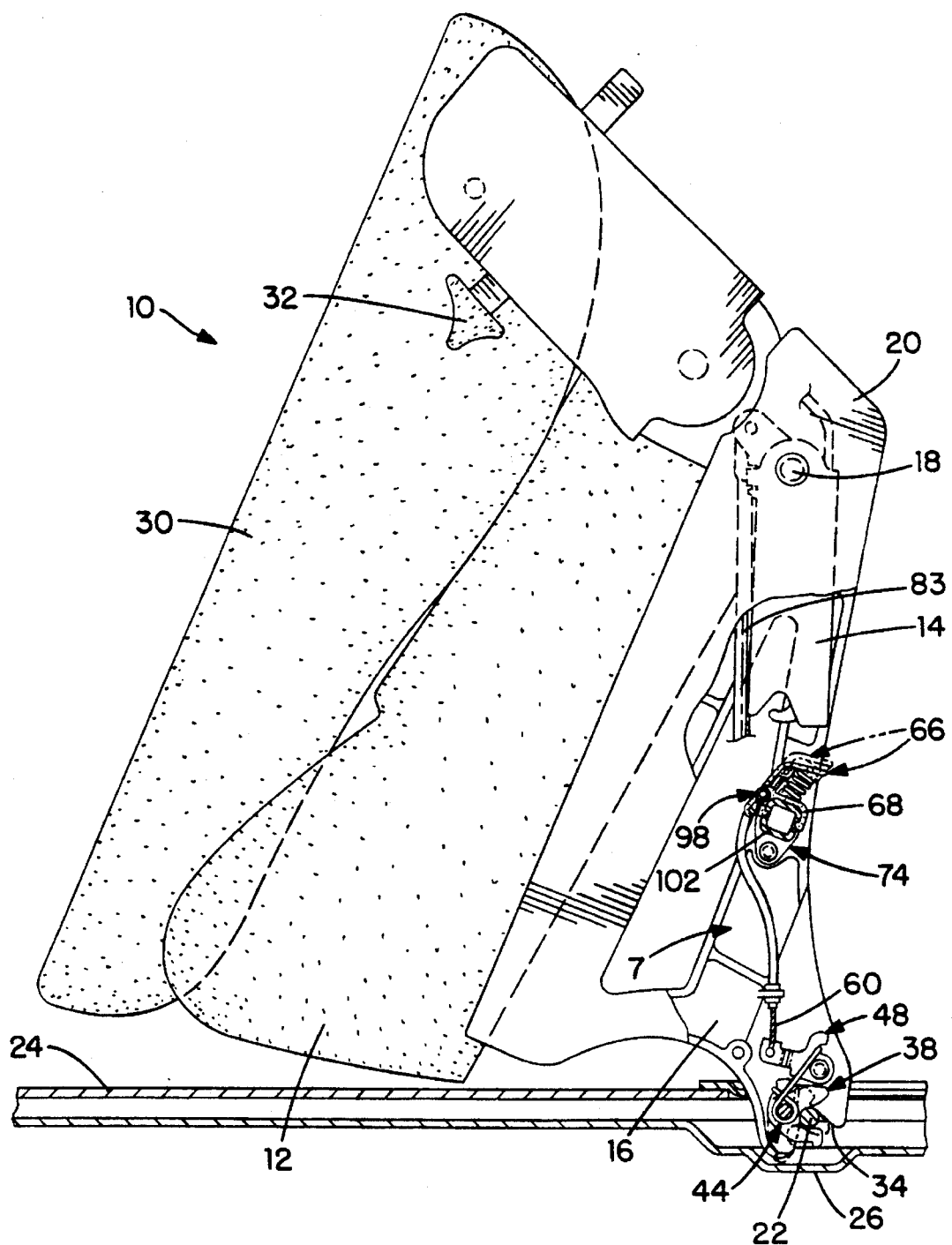
FIG. 3 is a side elevational view, partially sectioned, showing the seat illustrated in FIG. 1 in the inclined storage position with the rear legs released from the vehicle floor with the latch system remaining in the locked position.
Figure 4:
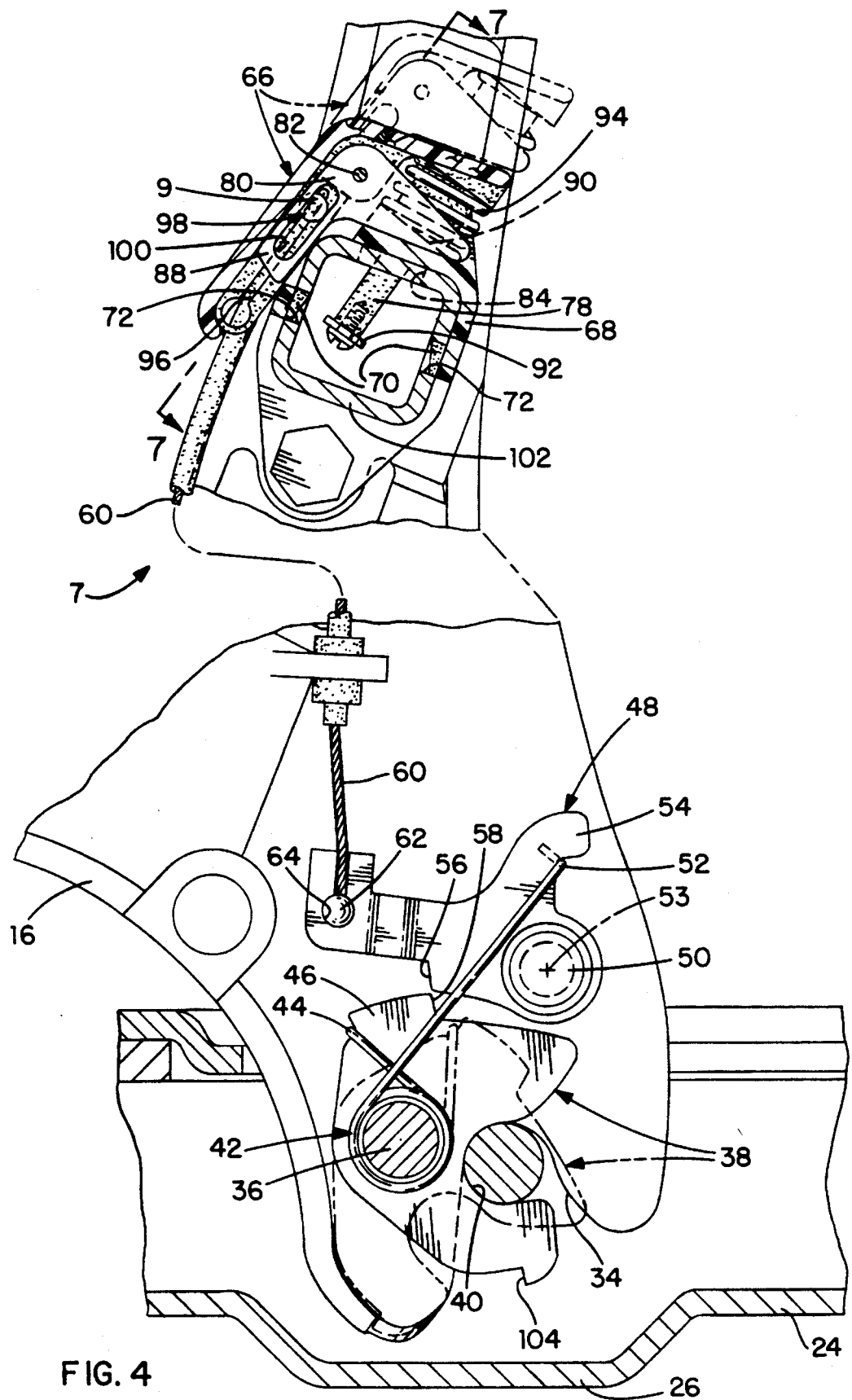
FIG. 4 is an enlarged view of the latch assembly shown in FIG. 3 demonstrating released actuation of the latch system.
Figure 5:
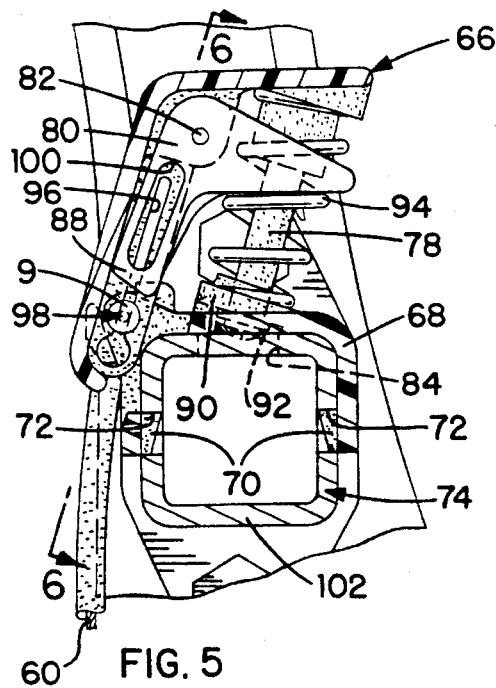
FIG. 5 is an enlarged view of a portion of the latch system shown in FIG. 3 showing a handle of the latch in the locked, nonreleased position.
Figure 6:
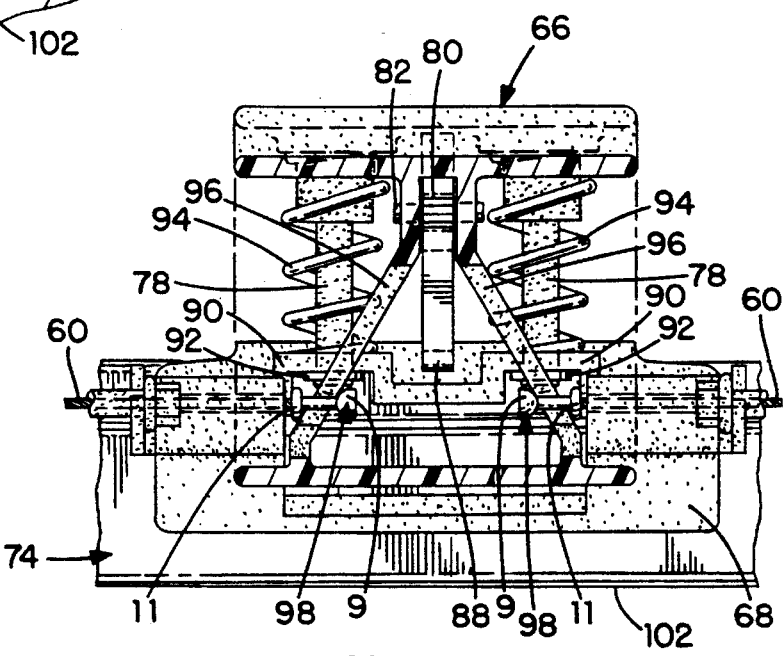
FIG. 6 is a view taken along line 6—6 of FIG. 5.

Referring additionally to FIGS. 3, 5 and 6, the seat 10 is shown in its storage position wherein the rear legs 14 have been detached from their respective floor pins. A lever 83 connected to a spring in a manner similar to that of Bolsworth et al or, in an alternate embodiment, a torsional spring connected to the legs 14 causes the legs 14 to pivot and locate themselves between the sides of the underframe 20. The inclined storage position of the seat 10 now exposes the handle 66 to a vehicle operator or occupant.

Referring to FIGS. 5 and 6, an aperture or cutout 84 is provided in the cross tube 74 to allow penetration of studs 78 upon relative movement of the handle 66 toward the cross tube 74. The handle 66 is prevented in its movement toward the cross tube 74 by virtue of the end 88 of the pendulum arm making contact with the housing 68 whenever the seat is in the normal seating position.

The housing 68 has an inner wall 90 (best shown in FIG. 6). The inner wall 90 provides a stop surface of contact for a washer 92 held by a threaded fastener on the end of the stud 78. A coil spring 94 biases the handle 66 to place the handle 66 in a first locking position. The spring 94 surrounds the stud 78.

The handle 66 also has two inclined guides or slots 96. Captured within the slots 96 are two I-bolts 98. I-bolts 98 have ends 9 and 11 and are connected to the end of the cables 60.

When the vehicle seat 10 is placed in a position approximating that shown in FIGS. 3 through 6, the weight of the pendulum is such that the pendulum will have its end 88 pointed for contact with the cross tube or slightly above the cross tube. It should be noted that cutout 100 of the pendulum is simply for weight purposes and may be eliminated, depending on the criteria utilized by the designer, by modification of the pendulum design.

Figure 7:
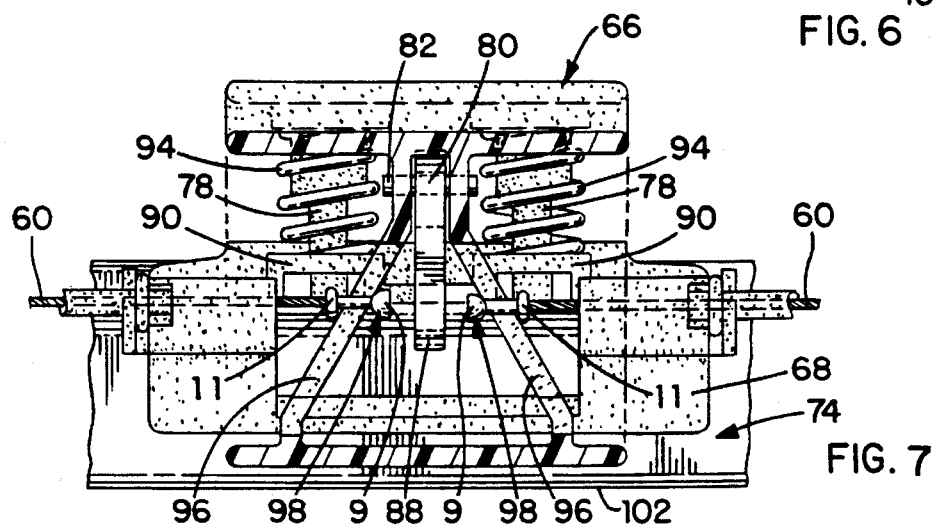
FIG. 7 is a view taken along line 7—7 of FIG. 4.

Referring additionally to FIGS. 5 and 7, to pull the detent lever 48 to the second released position, the vehicle operator puts his or her hand over the handle 66 into side 102 of the crossbar, with his or her palms hitting approximately on the handle 66 and compressing it. This causes the studs 78 to extend within the internal cavity of the cross tube 74, effectuating a pulling force on both cables 60 by virtue of the I-bolts 98 (best shown in FIG. 7), moving the ends of the cables connected to the I-bolt 98 closer toward one another. This pull force causes the fork bolt 38 under the biasing of the spring 42 to rotate clockwise (after a slight upward rearward pull on the seat 10 to take the weight of the seat 10 off the fork bolt 38). The risers 16 may then be removed from the pins 22. An edge 104 on the fork bolt prevents the fork bolt 38 from rotating too far in the clockwise orientation. To get the front riser 16 to re-attach itself to the pin 22 on installation, hitting the fork bolt 38 with the pin 22 automatically rotates the fork bolt 38 backwards, lifting up the detent lever 48 (rotate clockwise) until the step 56 drops down onto the surface 58, relocking the fork bolt 38.

One of the major advantages of the present invention is that operation of the latching system 7 is an extremely low force amount and also a person may release the seat, pick it up and remove it with just one hand.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A latch system for a support of a vehicle seat, the seat having a seating position wherein a seating portion of the seat is generally horizontally oriented, the seat also having first and second supports which are connected to the floor of the vehicle, the first support being connected via a floor pin, and the seat having a storage position wherein only the first support is connected to the vehicle floor with the seating portion inclined upwardly, the latch system in combination comprising:

a riser floor pin contact surface provided on the first support to make contact with the floor pin;

a fork bolt pivotally mounted with respect to the first support, the fork bolt having a nest for engagement with the floor pin, the fork bolt being spring biased to a first locking position engaged with the floor pin, capturing the floor pin between itself and the first support contact surface, and the fork bolt having a second releasing position allowing removal of the first support from the floor pin;

a detent lever pivotally mounted with respect to the first support, the detent lever being spring biased to a first position preventing movement of the fork bolt to the fork bolt second position and the detent lever having a second releasing position allowing the fork bolt to move to the fork bolt second releasing position;

a cable connected to the detent lever for pulling the detent lever to the second releasing position;

a handle connected to the cable, the handle being mounted for relative motion with respect to the seat and spring biased to a first locking position away from a second releasing position wherein the handle is pulling on the cable, thereby moving the detent lever to the detent lever's second releasing position; and a pendulum pivotally mounted with respect to the handle, having a first position when the seat is in the first seating position wherein the pendulum blocks movement of the handle to the handle second position when the seat is in the seating position and wherein the pendulum allows the handle to move to the handle's second releasing position when the seat is in the storage position.

2. A latch system as described in claim 1 wherein the pendulum is directly pivotally mounted to the handle.

3. A latch system as described in claim 1 provided with a common torsion spring for biasing the fork bolt and detent levers to their respective first locking positions.

4. A latch system as described in claim 1 wherein the handle moves in a generally linear fashion and has a ramp and wherein an end of the cable is connected to the handle along the ramp and where movement of the handle causes the cable end to follow the ramp to effectuate the pull force on the cable.

5. A latch system for a forward support of a vehicle seat, the seat having a seating position wherein a seating portion of the seat is generally oriented horizontally and wherein a forward support and a rearward support are connected to the floor of the vehicle, the forward support being connected via a floor pin, and the seat having a storage position wherein only the forward support is connected to the vehicle floor with the seating portion inclined upwardly, the latch system in combination comprising:

a riser floor pin contact surface provided on the forward support to make contact with the floor pin;

a fork bolt pivotally mounted with respect to the forward support, the fork bolt having a nest for engagement with the floor pin, the fork bolt being spring biased to a first locking position engaged with the floor pin, capturing the floor pin between itself and the forward support contact surface, and the fork bolt having a second releasing position allowing removal of the support from the floor pin;

a detent lever pivotally mounted with respect to the forward support, the detent lever being spring biased to a first locking position preventing movement of the fork bolt to the fork bolt second releasing position, and the detent lever having a second releasing position allowing the fork bolt to move to the fork bolt second releasing position;

a torsion spring biasing the fork bolt and the detent lever to their respective first positions;

a cable connected to the detent lever for pulling the detent lever to the detent lever second releasing position;

a handle connected to the cable, the handle being slidably mounted to the seat in an orientation generally perpendicular to an orientation of the handle and the handle being spring biased to a first locking position away from a second releasing position, the handle having an inclined ramp for attachment of the cable and movement of the handle to the second position causes the cable to follow the inclined ramp and to be pulled, thereby moving the detent lever to the second releasing position; and a pendulum pivotally mounted directly to the handle, the pendulum having a first locking position when the seat is in the seating position wherein the pendulum blocks movement of the handle to the handle second releasing position and wherein, when the seat is in the storage position, the pendulum allows the handle to be moved to the second releasing position.

6. A latch system as described in claim 1 wherein the handle is mounted on a cross tube of the seat and wherein from the vehicle seat storage position with one hand the handle may be moved to the second releasing position and the seat may be grasped.

* * * * *